US006502043B2

(12) United States Patent

Dussac

(10) Patent No.: US 6,502,043 B2

(45) Date of Patent: Dec. 31, 2002

(54) PROCESS AND DEVICE FOR REDUCING THE SPECTRAL LINE NOISE INSIDE AN AIRCRAFT, ESPECIALLY A ROTATING-WING AIRCRAFT, IN PARTICULAR A HELICOPTER

(75) Inventor: Marc Dussac, Miramas (FR)

(73) Assignee: Eurocopter, Marignane Cedex (FR)

( * ) Notice: Subject to any disclaimer, the term of this patent is extended or adjusted under 35 U.S.C. 154(b) by 72 days.

(21) Appl. No.: 09/730,541

(22) Filed: Dec. 7, 2000

(65) Prior Publication Data

US 2001/0005814 A1 Jun. 28, 2001

(30) Foreign Application Priority Data

Dec. 10, 1999 (FR) .......................................... 99 15599

(51) Int. Cl.7 ......................... G06F 19/00; G08B 21/00

(52) U.S. Cl. ......................... 702/56; 342/203; 342/204; 702/76; 340/946

(58) Field of Search ......................... 356/454; 342/405, 342/127; 340/943

(56) References Cited

U.S. PATENT DOCUMENTS

| | | | | | |
|---|---|---|---|---|---|
| 3,845,486 | A | * | 10/1974 | Birchenough | 342/405 |
| 3,895,344 | A | * | 7/1975 | Gill et al. | 340/943 |
| 4,195,931 | A | * | 4/1980 | Hara | 356/454 |
| 5,436,847 | A | * | 7/1995 | Schroer et al. | 702/76 |
| 5,486,833 | A | * | 1/1996 | Barrett | 342/204 |
| 5,497,160 | A | * | 3/1996 | Koehler et al. | 342/127 |
| 5,845,236 | A | | 12/1998 | Jolly et al. | |

FOREIGN PATENT DOCUMENTS

| | | |
|---|---|---|
| FR | 2732807 | 10/1996 |
| FR | 2769396 | 4/1999 |
| WO | 98006089 | 2/1998 |

* cited by examiner

*Primary Examiner*—John S. Hilten
*Assistant Examiner*—Aditya S Bhat
(74) *Attorney, Agent, or Firm*—Stevens, Davis, Miller & Mosher, LLP

(57) ABSTRACT

Process and device for reducing the spectral line noise inside an aircraft, especially a rotating-wing aircraft, in particular a helicopter.

Said device (1) comprises sensors (Ca, Cb) for measuring the values of vibratory and/or acoustic parameters, controllable mechanical elements (A) forming secondary sources of noise, and a main computer (CAL) determining, on the basis of the values measured by the sensors (Ca, Cb), control commands for the mechanical elements (A), as well as at least one reference sensor (CO) for measuring a reference parameter which is correlated with the noise, and possibly an auxiliary computer (4) for calculating, on the basis of the values measured by the reference sensor (CO), a reference signal, and said main computer (CAL) determines the control commands by carrying out filtering with respect to the reference signal.

13 Claims, 2 Drawing Sheets

PROCESS AND DEVICE FOR REDUCING THE SPECTRAL LINE NOISE INSIDE AN AIRCRAFT, ESPECIALLY A ROTATING-WING AIRCRAFT, IN PARTICULAR A HELICOPTER

BACKGROUND OF THE INVENTION

The present invention relates to a process and device for reducing the spectral line noise inside an aircraft, especially a rotating-wing aircraft, and in particular a helicopter.

More particularly, it applies to the reducing of the noise in the cockpit and/or in the passenger cabin of said aircraft.

It is known that, on a rotating-wing aircraft, the acoustic spectra defined in the domain lying between 20 Hz and 20 kHz pertain to the superposition of noises of different origins, which can be clustered into two different groups depending on their spectral characteristics, namely pure sounds or spectral line noises and broadband noises.

In a known manner, pure sounds or spectral line noises occur especially, as the case may be:

- at characteristic frequencies of the kinematic chain of the aircraft;
- at the frequencies of rotation of the blades of the rotors (main and rear) and at the harmonics of these frequencies;
- at the frequencies of rotation of the blades of the compressors of the turbomotor sets; and/or
- at the frequencies of rotation of the blades of the fans for cooling the main gearbox and/or of electrical equipment, as well as at the harmonics of these frequencies, while broadband noises comprise especially as the case may be:

- noise from a boundary layer developing on the fuselage;
- noise generated by the rotors;
- noise from the flow in the air inlets and nozzles;
- engine noise; and/or
- noise from the air conditioning or heating circuits of the cockpit or of the passenger cabin.

Although all these noises may pose problems, the acoustic annoyance experienced by the passengers and the crew is caused essentially by spectral line noises. Consequently, the main object of the present invention, which reckons to limit this acoustic annoyance, is to reduce said spectral line noises.

There are various known solutions for reducing such noises inside a rotating-wing aircraft, especially a helicopter.

A first known solution has the object of reducing the vibratory level of or the radiation from noise sources and/or the fuselage. For this purpose, various physical actions may be implemented, especially:

- a reduction in the vibrations of the structure and/or mechanical members, by damping or modifying the stiffness or the mass;
- an attenuation in the acoustic transmission, by damping or modifying the stiffness or mass;
- a double-partition effect, by shrouding the relevant source;
- acoustic absorption by fibrous or cellular materials; and
- acoustic absorption by Helmhotz resonators.

The first four physical actions above make it possible to decrease the general level of noise in a wide domain of frequencies, but they entail a considerable and very disadvantageous increase in mass. Moreover, the noise decrease then obtained is not selective enough to dispose of the acoustic annoyance specific to pure sounds.

On the other hand, the fifth and last physical action above makes it possible effectively to reduce the spectral line noise, although only in a narrow band of frequencies, defined during the design.

This above first solution based on passive processing of the noise is therefore hardly effective, especially for spectral line noises generated by vibratory or acoustic excitations dependent in particular on the rotation regime, prone to variations as a function of time, of rotating machines.

A second known solution advocates active noise control.

The document WO-98/06089 discloses a system for actively controlling noise and vibrations in the cabin of an aircraft. This known system comprises:

- sensors for measuring the values of vibratory and/or acoustic parameters representative of vibratory and/or acoustic effects of sources of noise of said aircraft;
- reference sensors for measuring the values of reference parameters;
- active and controllable vibration absorber means which are able to reduce the vibratory and/or acoustic effects of said sources of noise; and
- a main computer determining, on the basis of the values measured by said sensors and said reference sensors, control commands for said vibration absorber means, with a view to reducing the noise and the vibrations inside said aircraft.

Another example of active control is described in the document FR-2 732 807 which discloses a personal process and a personal device for acoustic attenuation. This known document envisages an attenuator assembly which comprises sensors and loudspeakers arranged in proximity to the head of a passenger of an aircraft. These loudspeakers are intended to create counter-noises in order to attenuate the noises existing in proximity to the head of the passenger, by combining with these noises.

This attenuator assembly thus only allows individual and very localized attenuation of the noise in proximity to a passenger's seat.

This known device has numerous drawbacks. In particular:

- it requires a number of loudspeakers and of microphones which is proportional to the number of seats for which one wishes to carry out acoustic attenuation, this proving to be expensive, bulky and penalizing in terms of mass, in particular for large cabins;
- a loss of available volume in the cabin occurs; and
- it is necessary to adapt the existing seats, this of course being expensive.

Consequently, this known solution, which is based on active processing which is both localized and individual, is hardly satisfactory for reducing the spectral line noise in a rotating-wing aircraft furnished with a large cabin which may contain a plurality of pilots and passengers.

The document FR-2 769 396 from the applicant describes a device making it possible to remedy these drawbacks. This known device is a device of reduced mass, cost and bulk making it possible effectively to decrease, in a substantially global and nonindividual manner, the noise, and more particularly the spectral line noise, inside a rotating-wing aircraft. For this purpose, this known device comprises:

- sensors for measuring the values of at least one vibratory and/or acoustic parameter representative of a vibratory and/or acoustic effect of at least one source of noise of said aircraft;

controllable mechanical means able to create a loading capable of reducing the vibratory and/or acoustic effect of said source of noise; and a control unit, for controlling said mechanical means, as a function of the values measured by said sensors.

In a particular embodiment, this known device comprises P sensors Cp arranged at points Mp and capable of measuring one and the same vibratory and/or acoustic parameter, and Q mechanical means Aq able respectively to create loadings capable of reducing one and the same vibratory and/or acoustic effect, and the control unit carries out, repetitively, the following successive operations:

it calculates, for each of said P sensors Cp, a value P1*p* satisfying the relation:

$$P1p=P2p+\Sigma q(Tq,p.P3q),$$

q varying from 1 to Q, in which:

P2*p* corresponds to the value of said vibratory and/or acoustic parameter which exists at the point Mp in the absence of action of said device and which depends on the value measured by the sensor Cp;

P3*q* is the value of said vibratory and/or acoustic parameter, due to the action of the mechanical means Aq and dependent on the control of said mechanical means Aq; and Tq,p is a value for transferring between the value of said parameter existing at the level of the mechanical means Aq and the corresponding value existing at the point Mp;

it calculates the sum:

$$\Sigma p|P1p|^2,$$

p varying from 1 to P; and it minimizes the above sum so as to deduce therefrom the control commands for said Q mechanical means Aq, which are addressed to these latter.

Consequently, this known device which can be adapted to the flight conditions, by controlling for this purpose said mechanical means, carries out in particular global attenuation, that is to say at least over the set of P controlled sensors, and not individual attenuation like the device described in the document FR-2 732 807, and is therefore particularly effective.

SUMMARY OF THE INVENTION

The object of the present invention is to perfect the teaching provided by the document FR-2 769 396.

It relates to a process for reducing the spectral line noise inside an aircraft, especially a rotating-wing aircraft and in particular a helicopter, which process makes it possible to reduce in a particularly effective manner the most annoying spectral line noise(s), whilst being adaptable to any variation (in particular in frequency and in amplitude) of the source(s) of noise and to any desired modification of the noise reduction (especially relating to its localization).

To this end, said process according to which the following operations are carried out repetitively and automatically:

a) for each of the I points Mi, i varying form 1 to I, situated on said rotating-wing aircraft, the value P2*mi* of a vibratory and/or acoustic parameter which exists at said point Mi is measured, said vibratory and/or acoustic parameter being representative of a vibratory and/or acoustic effect of at least one so-called primary source of noise of said aircraft;

b) for each of said I points Mi, a value P1*i* corresponding to the relation:

$$P1i = P2i + \sum_{j=1}^{j=J} (Tj, i \cdot P3j)$$

is measured in real time, in which relation:

P2*i* is representative of the value P2*mi* measured in the absence of active control;

Tj,i is a value for transferring between the value of a vibratory and/or acoustic parameter existing at the level of a controllable mechanical element, forming a secondary source of noise, and the corresponding value existing at said point Mi; and P3*j* is a value of said vibratory and/or acoustic parameter, due to the action of said mechanical element and dependent on the control of the latter; and c) on the basis of the values P1*i* measured in real time for all the I points Mi, a sum S is calculated, satisfying the relation:

$$S = \sum_{i=1}^{i=I} |P1i|^2$$

d) said sum S is minimized so as to deduce therefrom control commands for said J mechanical elements; and e) the control commands thus deduced are applied to said J mechanical elements, is noteworthy according to the invention in that, repetitively and automatically, in a preliminary step, the value Vr of at least one reference parameter which is correlated with the noise from said primary source of noise is measured and, on the basis of said measured value of the reference parameter, a reference signal is determined, and in step d), said sum S is minimized by carrying out filtering with respect to said reference signal determined in said preliminary step.

Thus, since said reference signal is correlated with the noise, it is representative (especially in frequency and in amplitude) of the noise existing in the aircraft and hence of the strongest and most annoying spectral lines so that the noise reduction implemented by the present invention is targeted by appropriate filtering at these most annoying spectral lines, thereby making it possible to increase the effectiveness of the noise reduction and consequently the comfort of the pilots and the passengers.

Moreover, advantageously, in said preliminary step, a plurality of R reference values Vr is measured and the reference signal SR is calculated on the basis of the relation:

$$SR = \sum_{r=1}^{r=R} Cr \cdot Vr,$$

the R values Cr representing coefficients. Thus, through an appropriate choice of said coefficients Cr, it is possible to obtain a reference signal SR which manifests all the frequencies whose magnitude one wishes to reduce, especially in the “SIL4” frequency domain and for the entire flight domain, the “SIL4” frequency domain being defined by the four octaves with central frequencies situated at 500 Hz, 1000 Hz, 2000 Hz and 4000 Hz respectively.

Furthermore, advantageously, before control is adjusted and used, in step b) above, each value P2*i* is determined from the relation:

$$P2i=\alpha i.P2mi,$$

in which αi is a weighting coefficient, preferably lying between 0 and 1. This makes it possible to carry out a spatially "discriminated" reduction in the noise, by greater or lesser weighting of the values measured at the various points Mi. This characteristic makes it possible to favor, during the noise reduction, certain zones, for example certain passenger places on the aircraft, with respect to others or certain particular frequencies occurring in the noise spectrum.

Moreover, according to the invention, the number J of mechanical elements (loudspeakers and/or mechanical actuators) is less than or equal to the number I of points Mi. Consequently, it is possible to reduce the noise in a number of zones, which is greater than the number of mechanical elements representing the secondary sources of noise, envisaged for this purpose, this of course being particularly advantageous, especially as compared with the known device disclosed by the aforesaid document FR-2 732 807.

Within the context of the present invention, the aforesaid preliminary step of the process in accordance with the invention can be implemented:

- either simultaneously with steps a) and b), that is to say in the course of the flight;
- or in a phase prior to said steps a) and b), especially in a mission preparation phase.

More precisely, it will be noted that the acquisition of the R reference signals Vr can be effected in two different ways:

- either, these signals are measured before the implementation of active control and the R coefficients Cr are selected. During control, the reference signal SR is utilized, with the coefficients Cr frozen;
- or, the R signals Vr are measured during control, these being adaptable during the mission, and the user has the possibility of then adjusting the coefficients Cr himself. During effective control, the utilization of the reference signal remains identical, of course, to the previous case.

It will be noted moreover that the measurements P2*mi* will have to be acquired during an identification flight, before the flights with control. This is because this involves adjusting the dynamic range behavior of the acquisition chain (sensors, recorders, etc.) so as to ensure a sufficient margin so as not to saturate the amplifiers, etc.

The present invention also relates to a device for reducing the spectral line noise inside a rotating-wing aircraft.

This device, which is of the type of that disclosed in the aforesaid document WO-98/06089, comprises in a known manner:

- sensors for measuring the values of vibratory and/or acoustic parameters representative of at least one vibratory and/or acoustic effect of at least one primary source of noise of said rotating-wing aircraft;
- at least one reference sensor for measuring the values of at least one reference parameter which is correlated with the noise of said rotating-wing aircraft;
- controllable mechanical elements forming secondary sources of noise which are able to create, under the effect of control commands, loadings which are capable of reducing the vibratory and/or acoustic effect of said primary source of noise; and
- a main computer determining, on the basis of the values measured by said sensors and said reference sensor, control commands for said mechanical elements, with a view to reducing the spectral line noise inside said aircraft.

According to the invention, this device is noteworthy in that said main computer determines said control commands by calculating a sum S satisfying the relation:

$$S = \sum_{i=1}^{i=I} |P1i|^2$$

on the basis of I values P1*i* measured by said sensors and by minimizing said sum S by means of filtering with respect to a reference signal which depends on the measured values of said reference parameter.

Thus, by virtue of the invention, said device makes it possible to implement noise reduction targeted at the most annoying spectral lines, as indicated hereinabove.

It will be noted that said auxiliary computer is not necessary when the reference signal corresponds to the value of a single reference parameter, which value is measured by a single reference sensor.

Moreover, by virtue of the invention:

- one is able to adapt said noise reduction device to the flight conditions, by controlling the mechanical means;
- by reason of a reduced number of components, the device in accordance with the invention is relatively compact, light and inexpensive;
- since its components are independent of the aircraft, said device can be embodied in the form of an optional ready-to-mount control kit capable of being mounted on any type or rotating-wing aircraft; and
- said device is capable of reducing all annoying spectral line noises liable to exist, regardless of their frequency, below 10 kHz and especially in the "SIL4" frequency domain.

Furthermore, said device advantageously comprises means for weighting the values measured by said sensors.

Moreover, according to the invention:

- said sensors are microphones for measuring acoustic parameters and/or accelerometers for measuring vibratory parameters; and
- said mechanical elements are loudspeakers and/or mechanical actuators of standard type.

The figures of the appended drawing will elucidate the manner in which the invention may be embodied. In these figures, identical references denote similar elements.

DETAILED DESCRIPTION OF PREFERRED EMBODIMENT

Figure 1:
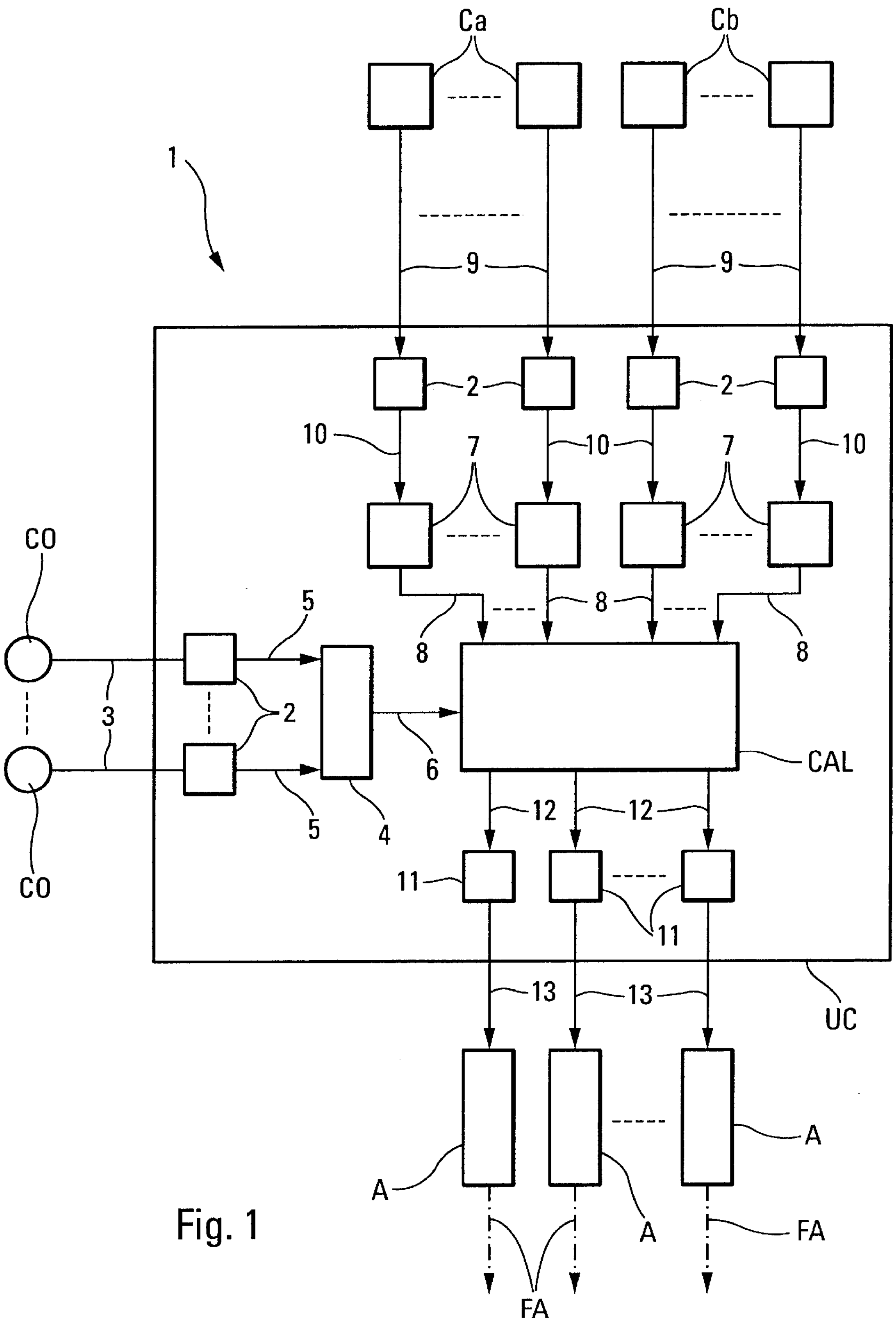
FIG. 1 is a schematic diagram of a device in accordance with the invention.

The device 1 in accordance with the invention and represented diagrammatically in FIG. 1 is intended for reducing the noise inside a rotating-wing aircraft, especially a helicopter, not represented, and more particularly the spectral line noise.

Such spectral line noise is generated in a known manner by the operation of rotary members (for example a pair of meshing gears, a roller bearing, a fan, a compressor, a rotor, etc.) and it depends on the conditions of transmission of the mechanical power (torque, rotation regime, lubrication, conditions of fastening to the structure or of linking with other rotating parts, mounting or balancing conditions,.

More precisely, the device 1 in accordance with the invention is intended for reducing the noise inside the cockpit and/or the passenger cabin, where it is most annoying.

For this purpose, said device 1 comprises, in a known manner:

- a plurality I of sensors Ca and Cb specified hereinbelow, situated at points Mi on the aircraft, i varying from 1 to I, capable of measuring the values P2$mi$ of at least one vibratory and/or acoustic parameter representative of the vibratory and/or acoustic effects of sources (so-called primary sources) of noise, not represented and specified hereinbelow;
- a plurality J of controllable mechanical elements A also specified hereinbelow, J being less than or equal to I, said mechanical elements A being able to create loadings capable of reducing the vibratory and/or acoustic effects of said primary sources of noise, as illustrated by chain-dotted arrows FA. For this purpose, the number and location of said mechanical means A are chosen, as explained hereinbelow, in such as way as to obtain the biggest possible reduction; and
- a main computer CAL linked to said sensors Ca, Cb and to said mechanical elements A, and which is capable of calculating control commands for said mechanical elements A as a function of the values measured by said sensors Ca and Cb, and of addressing the control commands thus computed to said mechanical elements A. Said main computer CAL determines said control commands in such a way as to obtain the biggest possible reduction in noise, as specified hereinbelow.

Said reduction device 1 is therefore active: its noise reduction action can be modified and adapted continuously to the existing conditions (especially flight conditions), since said main computer CAL determines the control commands in real time and uses for this purpose actual measured values.

To do this, said computer CAL carries out the following operations repetitively and automatically:

A) for each of the I points Mi at which the sensors Ca and Cb are located, it calculates a value P1$i$, from the relation:

$$P1i = P2i + \sum_{j=1}^{j=J} (Tj,\ i.P3j)$$

in which:

- P2$i$ is representative of the value P2$mi$ measured by the corresponding sensor Ca or Cb;
- Tj,i is a value for transferring between the value of a vibratory and/or acoustic parameter existing at the level of a mechanical element (A), and the corresponding value existing at said point Mi; and
- P3$j$ is a value of said vibratory and/or acoustic parameter, due to the action of said mechanical element (A) and dependent on the control of the latter;

B) from the values P1$i$ for all the I points Mi, it calculates a sum S satisfying the relation:

$$S = \sum_{i=1}^{i=I} |P1i|^2$$

C) it minimizes said sum S so as to deduce therefrom control commands for said J mechanical elements A; and D) it transmits the control commands thus deduced to said J mechanical elements A.

According to the invention, said device 1 moreover includes:

- reference sensors CO for measuring the values Vr of reference parameters, which are correlated with the noise of said aircraft;
- analog/digital converters 2 which are linked by links 3 to said reference sensors CO and convert the analog values measured by these sensors into digital values to be processed; and
- an auxiliary computer 4 which is linked by links 5 to said converters 2 and which calculates, on the basis of the values measured Vr by the reference sensors CO, a reference signal SR specified hereinbelow, which is transmitted via a link 6 to said main computer CAL. This auxiliary computer 4 is not necessary when the reference signal SR corresponds to a single measured value Vr.

The latter determines, according to the invention, the control commands for the mechanical elements A, by carrying out filtering with respect to said reference signal SR. This filtering specified hereinbelow is carried out in step C) above, while minimizing the sum S.

Said reference signal SR therefore makes it possible to identify the noise or the spectral line to be reduced, that is to say the vibratory or acoustic manifestation which is at the origin of the annoying or most annoying acoustic nuisance.

Thus, the present invention makes it possible to target the noise reduction at the most annoying spectral line or lines, with which the reference signal SR is correlated, and hence to adapt the noise reduction to any changes of amplitude and/or of frequency of these spectral lines. Indeed if, for example a spectral line varies in frequency, this variation is detected by the measurements carried out by the reference sensors CO, is taken into account by the reference signal SR and is transmitted to the main computer CAL which then determines the control commands, as a function of this new frequency of the spectral line.

It will be noted that the invention makes it possible to reduce the spectral line noise inside a zone of the cabin, preferably at the level of the seats of the passengers and/or of the crew, over a wide band of frequencies. More particularly, the relevant frequency band is generally bounded by the lower limit of the octave with central frequency 500 Hz and the upper limit of the octave with central frequency 4000 Hz, that is to say 350 Hz and 5660 Hz approximately.

It will be noted moreover that the aforesaid transfer values Tj,i must be identified beforehand on the aircraft. This identification can be carried out on the ground or in flight. A stationary or pulsed excitation is dispatched to each mechanical element in turn (mechanical actuator, loudspeaker). The signals acquired synchronously by the sensors Ca, Cb then make it possible to calculate these transfer coefficients, so as to formulate the controls of the secondary sources (mechanical elements A).

According to the invention, the processing implemented by the main computer CAL consists in filtering the reference signal SR through an adaptive digital filter W(f) which produces the appropriate control u(t) for the secondary source (mechanical element A). The minimization is controlled by the sensors Ca and Cb which deliver signals e(t) allowing real-time adaptation of the corrector filter. The calculation of this filter can be carried out in the frequency domain or in the time domain. It requires a knowledge of the transfer function of the secondary path H(f) linking the control u(t) to the counter noise y(t). The identification can be done before processing if this function is quasi-invariable, or on-line if it is liable to vary over time. The algorithm used is a particular algorithm known as LMS ("Least Mean Square") with filtered reference.

It will be noted that a single reference sensor CO is sufficient to implement the present invention, in the aforesaid manner.

However, in addition to allowing more reliable detection of the most annoying spectral line or lines, the use of a plurality of reference sensors CO also allows the weighting of the values transmitted by these various sensors. It may be beneficial to reduce the effect of the measurements of a reference sensor CO when these measurements are very noisy or scarcely relate to the most annoying noises.

To do this, in the case of R reference sensors CO, the auxiliary computer 4 calculates the reference signal SR from the expression:

$$SR = \sum_{r=1}^{r=R} Cr.Vr$$

in which Vr is a measured value and Cr a weighting coefficient.

Within the context of the present invention, said reference sensors CO can be:

- microphones which are arranged in the cabin, in the compartment of the main gearbox or in the hold of the aircraft; and/or
- accelerometers which are arranged on:
  - the bearings of the kinematic chain;
  - the bars for fastening the main gearbox to the fuselage;
  - the mechanical suspension of the main gearbox;
  - the structure of the fuselage; or
  - the cladding panels of the cabin.

According to the invention, the device 1 moreover includes means 7 associated respectively with the sensors Ca and Cb and intended for determining, from the values P2*mi* measured by these sensors, the values P2*i* to be transmitted to the main computer CAL, by way of links 8.

According to the invention, each of said values P2*i* is defined on the basis of the relation:

$$P2i = \alpha i.P2mi$$

in which αi is a weighting coefficient, preferably lying between 0 and 1, for modifying the contribution to the total quadratic error illustrated by the sum S of the above step B). This enables the values arising from certain sensors to be assessed differently, so as to favor specified zones of the aircraft, for example in proximity to certain passenger seats.

Of course, when no weighting is desired, one simply sets all the coefficients αi to 1, in said weighting means 7.

As may be seen in FIG. 1, the device 1 moreover includes:

- analog/digital converters 2 which are linked by way of links 9 and 10 respectively to the sensors Ca, Cb and to the weighting means 7; and
- digital/analog converters 11 which are linked by way of links 12 and 13 respectively to said main computer CAL and to said mechanical elements A.

Figure 2:
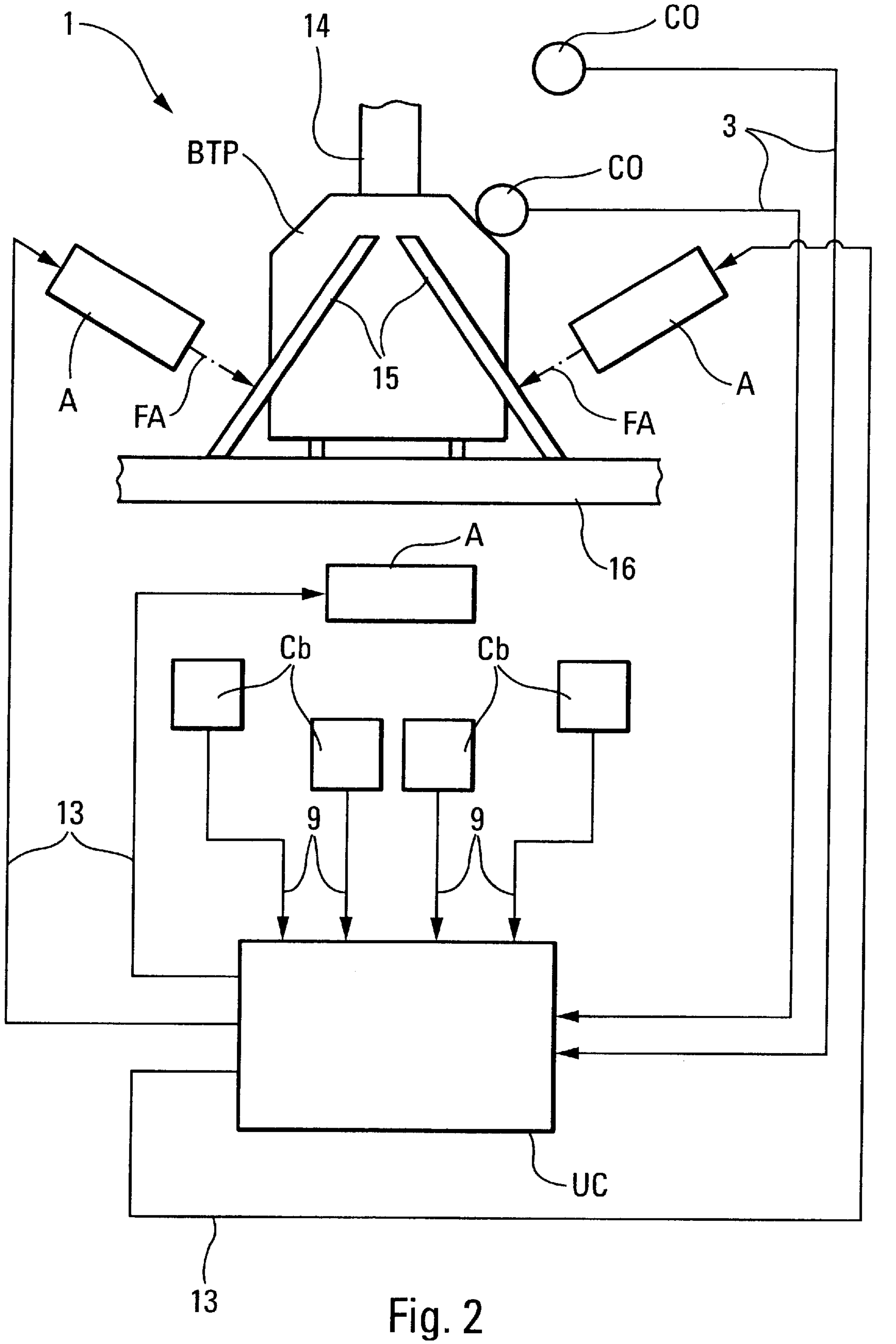
FIG. 2 partially illustrates a particular embodiment of the invention.

Moreover, except for the sensors Ca, Cb, the reference sensors CO and the mechanical elements A, all the elements of the device 1 are grouped together in a central unit UC in the particular embodiment represented in FIGS. 1 and 2.

Additionally, according to the invention, said sensors Ca, Cb are:

- accelerometers Ca situated at the level of structural zones of the aircraft, which effect a considerable transfer of energy at the relevant acoustic frequencies; and/or
- microphones Cb situated in the cabin; and/or
- any sensor capable of measuring a displacement, a velocity, an acceleration or a force in the relevant frequency domain.

As far as the mechanical elements A are concerned, these are:

- loudspeakers situated in the cabin; and/or
- mechanical actuators, of standard type; and/or
- electromagnetic vibrating "pots" or piezoelectric systems or any other suitable device.

All the possible combinations of the various aforesaid elements (sensors Ca, Cb, mechanical elements A) are conceivable within the context of the present invention.

For this purpose, it will be noted that, when the device 1 comprises:

- only loudspeakers and microphones, it carries out direct acoustic control;
- only mechanical actuators and microphones, it carries out vibro-acoustic control;
- only mechanical actuators and accelerometers, it carries out vibratory control.

Additionally, it should be noted that unlike the global reduction in accordance with the present invention, the local control envisaged in the aforesaid document FR-2 732 807:

- is incompatible with the complementary use of mechanical actuators, such as mechanical elements;
- does not make it possible to exploit the location of the vibratory sources; and
- is fixed as regards the type of secondary sources (loudspeakers) and the positioning of these secondary sources (upper part of a passenger seat).

Furthermore, it will be noted that the expression:

$$\sum_{j=1}^{j=J} (Tj, i.P3j)$$

used in step A) above can be written in the form:

$$\sum_{k=1}^{k=K} Ak, i.\gamma SECk + \sum_{l=K}^{l=J} Bl, i.PSECl$$

in which:

- Ak,i represents the complex transfer (modulus and phase), frequency-dependent, between the secondary excitation due to a mechanical actuator A and the acoustic pressure which would be measured at the point Mi if the mechanical actuator A were acting alone;
- Bl,i represents the complex transfer (modulus and phase), frequency-dependent, between the secondary pressure due to a loudspeaker A and the acoustic pressure which would be measured at the point: Mi if the loudspeaker were acting alone;
- γSECk is the acceleration measured near to the mechanical actuator A; and PSECl is the acoustic pressure generated by the loudspeaker at a representative point of the cabin.

In a particular embodiment represented in FIG. 2, the device 1 in accordance with the invention comprises:

four microphones Cb arranged in the cabin of the rotating-wing aircraft;

two reference sensors CO, one of which (a microphone) is mounted in the aircraft and the other of which (an accelerometer) is mounted on the main gearbox BTP. The latter carries in a known manner the mast 14 represented partially of the main lifting and forward-motion rotor of the aircraft and is mounted in particular by means of fastening bars 15 on the structure 16 of said aircraft; and two mechanical actuators A acting on said fastening bars 15 of the main gearbox BTP and a loudspeaker A which is arranged in the cabin under the structure 16.

By virtue of the invention, the device 1 represented in FIG. 1 can reduce the noises whose frequencies correspond to the fundamental and to the first few harmonics:

of the epicyclic stage or stages, of the bevel or spiral-bevel gear pairs, and of the straight or helical-angled cylindrical gear pairs.

Consequently, the set of frequencies for which the reduction is possible is:

the fundamental meshing frequency of each gear pair of the complete kinematic chain and of the epicyclic stage or stages of the main gearbox BTP as well as their harmonics (frequencies which are a multiple of the fundamental), and the meshing frequencies and their harmonics modulated by the frequencies of rotation and their first few harmonics of the shafts bearing these gears.

It is known that the meshing noise originates from the elements of the aircraft exhibiting gears, namely:

the main, rear and intermediate gearboxes;

the auxiliary gearbox known as the "Remote Auxiliary Gear Box";

the auxiliary power units for the electrical equipment; and the gears of the hydraulic systems and pumps.

The process in accordance with the invention, which relies on the combined use of secondary sources of noise, outside of the noise reduction zone, has the following important advantages:

the combined use of various types of secondary sources (mechanical and acoustic) makes it possible to optimize the controls, so as to reduce the noise at a greater number I of points than the number J of secondary sources;

the device 1 makes it possible to formulate a single reference from vibratory and/or acoustic signals, so as to take into account several (primary) sources of noise and to make best use of the dynamic range permitted by the signal/noise ratio in the cabin; and a relative weight (weighting) can be applied to the various points of the cabin where one wishes to reduce the noise so as to favor certain zones or places depending on the missions or the type of aircraft.

In addition to the aforesaid advantages, the device 1 in accordance with the invention has numerous other advantages, namely in particular:

the independence of its components relative to the architecture of the aircraft;

the possibility of embodying it in the form of an optional ready-to-mount kit, capable of being mounted on any type of rotating-wing aircraft. It will be noted that no prior modeling of the vibratory or acoustic transfers is necessary, but a first identification of the transfers between the mechanical elements A and the sensors Ca, Cb can be implemented on the ground. This identification can be repeated in flight, automatically and periodically, to ensure stability of control;

the advantage that any problem or fault with the device 1 entailing a drop in acoustic efficiency has no consequence on the operation of the aircraft and merely entails a possible increase in the internal noise to the level existing previously in the absence of control;

the possibility of reducing or of eliminating as the case may be the soundproofing in the form of cladding panels, which generally exhibit considerable mass; and the insensitivity of the active control carried out by the device 1 to inevitable acoustic leakages (holes for electrical wiring, lighting fixings, etc.).

What is claimed:

1. A process for reducing the spectral line noise inside a rotating-wing aircraft, in particular a helicopter, according to which process the following operations are carried out repetitively and automatically:

a) for each of I points Mi, i varying form 1 to I, situated on said rotating-wing aircraft, the value P2*mi* of a vibratory and/or acoustic parameter which exists at said point Mi is measured, said vibratory and/or acoustic parameter being representative of a vibratory and/or acoustic effect of at least one source of noise of said aircraft;

b) for each of said I points Mi, a value P1*i* corresponding to the relation:

$$P1i = P2i + \sum_{j=1}^{j=J} (Tj,\ i.P3j)$$

is measured in real time, in which relation:

P2*i* is representative of the value P2*mi* measured in the absence of active control;

Tj,i is a value for transferring between the value of a vibratory and/or acoustic parameter existing at the level of a controllable mechanical element (A), and the corresponding value existing at said point Mi; and P3*j* is a value of said vibratory and/or acoustic parameter, due to the action of said mechanical element (A) and dependent on the control of the latter; and c) on the basis of the values P1*i* measured in real time for all the I points Mi, a sum S is calculated, satisfying the relation:

$$S = \sum_{i=1}^{i=I} |P1i|^2$$

d) said sum S is minimized so as to deduce therefrom control commands for said mechanical elements (A); and e) the control commands thus deduced are applied to said mechanical elements (A), wherein, repetitively and automatically, in a preliminary step, the value of at least one reference parameter which is correlated with the noise from said source of noise is measured and, on the basis of said measured value of the reference parameter, a reference signal is determined, and in step d), said sum S is minimized by carrying out filtering with respect to said reference signal determined in said preliminary step.

2. The process as claimed in claim 1, wherein in the preliminary step, a plurality of R reference values Vr is measured and the reference signal SR is calculated on the basis of the relation:

$$SR = \sum_{r=1}^{r=R} Cr.Vr,$$

the R values Cr representing coefficients.

3. The process as claimed in claim 1, wherein in step b), each value P2*i* is determined from the relation:

$$P2i = \alpha i.P2mi,$$

in which αi is a weighting coefficient.

4. The process as claimed in claim 1, wherein the number J of mechanical elements (A) is less than or equal to the number I of points Mi.

5. The process as claimed in claim 1, wherein said preliminary step is carried out in a phase prior to said steps a) and b).

6. The process as claimed in claim 1, wherein said preliminary step is carried out simultaneously with at least one of said steps a) and b).

7. A device for reducing the spectral line noise inside a rotating-wing aircraft, especially a helicopter, said device comprising:

first sensors for measuring the values of vibratory and/or acoustic parameters representative of at least one vibratory and/or acoustic effect of at least one primary source of noise of said rotating-wing aircraft;

at least one reference sensor for measuring the values of at least one reference parameter which is correlated with the noise of said rotating-wing aircraft;

controllable mechanical elements forming secondary sources of noise which are able to create, under the effect of control commands, loadings which are capable of reducing the vibratory and/or acoustic effect of said primary source of noise; and a main computer determining, on the basis of the values measured by said first sensors and said reference sensor, control commands for said mechanical elements, with a view to reducing the spectral line noise inside said aircraft, wherein said main computer determines said control commands by calculating a sum S satisfying the relation:

$$S = \sum_{i=1}^{i=I} |P1i|^2$$

on the basis of I values P1i measured by said first sensors and by minimizing said sum S by means of filtering with respect to a reference signal which depends on the measured values of said reference parameter.

8. The device as claimed in claim 7, which furthermore includes an auxiliary computer for calculating, on the basis of the values measured by said reference sensor, said reference signal.

9. The device as claimed in claim 7, which includes means for weighting the values measured by said first sensors.

10. The device as claimed in claim 7, wherein at least one of said first sensors is a microphone situated in the cabin of said rotating-wing aircraft.

11. The device as claimed in claim 7, wherein at least one of said first sensors is an accelerometer.

12. The device as claimed in claim 7, wherein at least one of said mechanical elements is a loudspeaker situated in the cabin of said rotating-wing aircraft.

13. The device as claimed in claim 7, wherein at least one of said mechanical elements is a mechanical actuator.

* * * * *